United States Patent [19]

Mairle

[11] 4,292,774
[45] Oct. 6, 1981

[54] WINDOW MOUNTING FOR AUTOMOTIVE VEHICLES

[75] Inventor: Hans Mairle, Rennjngen, Fed. Rep. of Germany

[73] Assignee: Dr. Ing. h.c.F. Porsche Aktiengesellschaft, Stuttgart, Fed. Rep. of Germany

[21] Appl. No.: 105,705

[22] Filed: Dec. 20, 1979

[30] Foreign Application Priority Data

Dec. 22, 1978 [DE] Fed. Rep. of Germany ....... 2855526

[51] Int. Cl.³ .......................... E06B 3/26; E04B 1/62
[52] U.S. Cl. ........................................ 52/208; 52/395; 52/464; 296/84 R
[58] Field of Search ......................... 52/208, 395, 464; 296/84 R, 84 D

[56] References Cited

U.S. PATENT DOCUMENTS

| | | | |
|---|---|---|---|
| 1,940,968 | 12/1933 | Ohlis | 52/464 |
| 1,987,498 | 1/1935 | Stolp | 52/468 X |
| 2,061,760 | 11/1936 | Fisher | 296/84 R |
| 2,257,951 | 10/1941 | Haberstump | 296/84 R |
| 3,189,135 | 6/1965 | Slowinski | 52/464 X |
| 3,425,176 | 2/1969 | Cairns | 52/208 |
| 3,688,460 | 9/1972 | Van Loghem et al. | 52/468 X |
| 4,018,474 | 4/1977 | Kajio et al. | 296/84 R |

FOREIGN PATENT DOCUMENTS 258900  5/1965  Australia ................. 52/395

*Primary Examiner*—Alfred C. Perham
*Attorney, Agent, or Firm*—Craig and Antonelli

[57] ABSTRACT

A mounting arrangement for window panes in an automotive vehicle includes a cover strip and a column for receiving the window panes. The column has a flange which extends into a joint between the window panes, which are arranged along a contour line of the vehicle, in a manner that does not extend beyond the contour line. The cover strip fastens to the flange in a manner hiding the joint. According to a preferred embodiment, the flange is a component of a locking plate that has a T-shaped cross section, the locking plate being joined to a cap-shaped profile of the column and the cover strip having a section that fastens around the flange in a clip-like manner.

11 Claims, 1 Drawing Figure

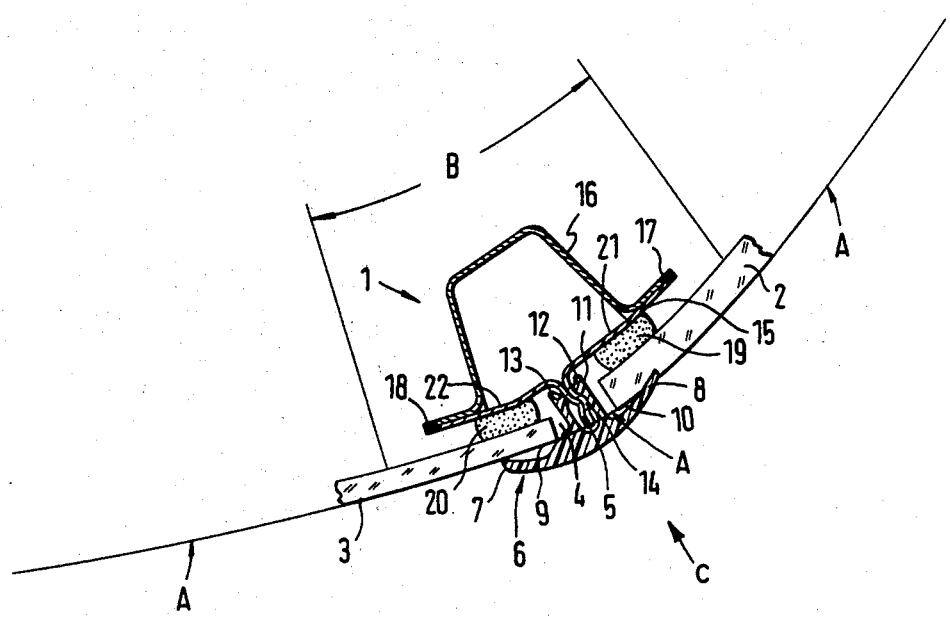

WINDOW MOUNTING FOR AUTOMOTIVE VEHICLES

BACKGROUND AND SUMMARY OF THE INVENTION

The invention relates to a mounting for windowpanes of automotive vehicles comprising a column including a flange to receive the windowpanes, and a cover strip.

In a conventional mounting of the aforementioned type of construction (U.S. Pat. No. 3,474,586) the column is constructed merely for accommodating a single windowpane, which restricts the unimpeded design of an automotive vehicle, preferably a passenger car.

It is an object of the invention to provide a mounting for windowpanes, the construction of which broadens the design possibilities for a vehicle superstructure.

According to a preferred embodiment of the invention, this object has been attained by providing that two windowpanes are arranged along a contour line and are placed one against the other with the formation of a joint at the column, wherein a flange extends within the joint and is constructed for fastening a cover strip hiding the joint. In this connection, it is advantageous to make the flange a part of a locking plate, having a T-shaped cross section, for a cap-shaped profile of the column. The locking plate consists of one piece. The cover strip has a section surrounding the flange in the manner of a bracket. The bracket-type section has supporting members in contact with the flange, an indentation at the flange extending behind these supporting members. The length of the flange is limited by the contour line. Additionally, the parts of the column constituting the cross section extend within the windowpanes.

The advantages attainable in particular by the present invention are to be seen in that the column is fashioned for holding two windowpanes extending along a contour line, whereby a contribution is made toward a free designing of vehicle superstructures. The cross section of the column is not limited by the way in which the window joint extends, which is of significance with respect to the demands for rigidifying car bodies in the zone of the passenger compartment. Furthermore, the mounting of the cover strip hiding the joint is simple and secure.

These and other objects, features and advantages of the present invention will become more apparent from the following description when taken in connection with the accompanying drawings, which show, for purposes of illustration only, several embodiments in accordance with the present invention.

BRIEF DESCRIPTION OF THE DRAWING

The sole FIGURE is a cross-sectional view through a preferred embodiment window mounting construction.

DETAILED DESCRIPTION OF THE PREFERRED EMBODIMENT

The column 1, shown in cross section, is fashioned for holding two windowpanes 2, 3. The panes 2, 3 are arranged along a contour line A of the vehicle and are placed against each other with the formation of a joint 4. The contour line A extends arcuately in the embodiment, but there is also the possibility of arranging the windowpanes along linear or angular contour lines due to the design flexibility afforded by the present invention.

The column 1 includes a flange 5 extending within the joint 4. The latter is hidden by a cover strip 6 attached to the flange 5.

The cover strip 6, which can be made of an elastic synthetic resin, aluminum, or the like, covers rims 9, 10 of the panes 2,3, with thin lips 7, 8 which project beyond the contour line A only to a minor extent in order to avoid wind noises. Lip 8, for illustration purposes only, is shown in its natural unflexed position; however, in use it rests upon the surface of windowpane 2 in the same manner shown with respect to lip 7, the lips being elastically flexed so that pre-tension forces hold them against their respective windowpanes.

A section 11 of strip 6 surrounds the flange 5 in the manner of a bracket or clip and serves for attaching the cover strip 6 to the flange. At the free end of section 11, supporting members 12, 13 of a wedge shape are provided which contact with the flange 5; an indentation 14 of the flange 5 extends behind at least one of these supporting members to support the strip 6 against any tendency to slide off.

The flange 5 is part of a locking plate 15, having a T-shape in cross section, for a cap-shaped profile 16 of column 1. The locking plate 15 and the cap-shaped profile 16 are joined together at 17 and 18 by suitable connecting methods, such as welding, gluing, or the like. The locking plate 15 consists of one piece and maintains the windows 2,3 in their position by the intermediary action of glue elements 19,20 at the wall portions 21,22.

The wall portions 21,22 extend at approximately the same distance with respect to the outerface of windowpanes 2,3, so that the configuration of the windowpanes 2,3 or of the joint 4 has no influence on the cross-sectional shaping of the windowpanes 2,3, e.g., the windowpanes need not be of equal thickness, but can be of different thicknesses as shown.

The windows 2,3 can be provided with a coating in zone B on the side facing the column 1, so that the column 1 is invisible from the outside C of the vehicle.

While we have shown and described only a single embodiment in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

What is claimed is:

1. Mounting arrangement for windowpanes of an automotive vehicle comprising a cover strip and a column receiving windowpanes, said column including a flange, characterized in that windowpanes of the vehicle are arranged along a contour line of the vehicle and are placed adjacent each other with a joint formed therebetween, wherein the flange is a base leg of a locking plate having a T-shaped cross section, top legs of the T-shaped locking plate being joined to a cap-shaped profile to define the column, said column being located adjacent to and outside of said joint except for its flange which extends within the joint and is fashioned for fastening the cover strip in a manner hiding the joint.

2. Mounting according to claim 1, characterized in that the locking plate is made of one piece.

3. Mounting according to claim 1, characterized in that the cover strip has a section which extends around the flange in the manner of a clip.

4. Mounting according to claim 3 characterized in that the clip section has supporting members which contact the flange with an indentation of the flange extending behind said supporting members.

5. Mounting arrangement according to claim 1, characterized in that the length of the flange does not extend beyond the contour line in a direction from an interior side of the vehicle toward an exterior side thereof.

6. Mounting arrangement according to claim 1, characterized in that the window panes overly the locking plate and cap-shaped profile of the column.

7. Mounting arrangement according to claim 6, wherein said windowpanes are attached to said locking plate.

8. Mounting arrangement according to claim 6, wherein two said windowpanes are secured to said locking plate by adhesive, a respective one windowpane being located at each side of said flange.

9. Mounting arrangement according to claims 7 or 8, wherein said windowpanes are coated on portions thereof so as to conceal said column from view from an outerside of the vehicle.

10. Mounting arrangement according to claims 1 or 3, wherein said cover strip is generally T-shaped in transverse cross-section, a base leg of said T-shaped cross-section forming said clip section, and top legs of said T-shaped cross-section being thin elastic lips that overly edges of said windowpanes adjacent said joint under pre-tension.

11. Mounting according to claim 6, wherein said top legs of the T-shaped locking plate extend at approximately the same distance with respect to an outerface of said windowpanes.

* * * * *